US012779813B2

(12) United States Patent
Swiszcz

(10) Patent No.: US 12,779,813 B2
(45) Date of Patent: Nov. 3, 2026

(54) LAMINATE

(71) Applicant: Hunter Douglas Inc., New York, NY (US)

(72) Inventor: Paul G. Swiszcz, Longmont, CO (US)

(73) Assignee: Hunter Douglas Inc., New York, NY (US)

( * ) Notice: Subject to any disclaimer, the term of this patent is extended or adjusted under 35 U.S.C. 154(b) by 162 days.

(21) Appl. No.: 18/552,130

(22) PCT Filed: Mar. 29, 2022

(86) PCT No.: PCT/US2022/022293
§ 371 (c)(1),
(2) Date: Sep. 22, 2023

(87) PCT Pub. No.: WO2022/212332
PCT Pub. Date: Oct. 6, 2022

(65) Prior Publication Data

US 2024/0165915 A1 May 23, 2024

Related U.S. Application Data

(60) Provisional application No. 63/167,972, filed on Mar. 30, 2021.

(51) Int. Cl.
*B32B 5/12* (2006.01)
*B32B 5/02* (2006.01)

(52) U.S. Cl.
CPC ................ *B32B 5/12* (2013.01); *B32B 5/022* (2013.01); *B32B 2250/20* (2013.01);
(Continued)

(58) Field of Classification Search
CPC ....... B32B 5/12; B32B 5/022; B32B 2262/16; B32B 2307/7376; B32B 2250/20;
(Continued)

(56) References Cited

U.S. PATENT DOCUMENTS 4,007,083 A † 2/1977 Ring
2005/0084647 A1 4/2005 Menzies et al.
(Continued)

FOREIGN PATENT DOCUMENTS

JP 129263 Y2 † 9/1989
WO 0041523 A2 † 7/2000

OTHER PUBLICATIONS

International Search Report and Written Opinion issued in PCT/US2022/022293 Dated Jun. 9, 2022 (9 pages).
(Continued)

*Primary Examiner* — Alicia J Weydemeyer
*Assistant Examiner* — Laura B Figg
(74) *Attorney, Agent, or Firm* — Dority & Manning, P.A.

(57) ABSTRACT

The present disclosure is generally directed to a fabric laminate for architectural coverings. The laminate generally includes a nonwoven layer laminated to oriented filaments. The nonwoven layer can be a wet laid nonwoven layer. The filaments can comprise continuous spunbond filaments. Optionally, the laminate can include a third layer of oriented yarns. In one aspect, the yarns can be oriented in the length direction while the polymer filaments can be oriented in the width direction.

19 Claims, 5 Drawing Sheets

(52) U.S. Cl.
CPC ... *B32B 2262/0276* (2013.01); *B32B 2262/16* (2021.05); *B32B 2307/718* (2013.01); *B32B 2307/7376* (2023.05); *B32B 2419/00* (2013.01)

(58) Field of Classification Search
CPC ...... B32B 2262/0276; B32B 2307/718; B32B 2419/00
See application file for complete search history.

(56) References Cited

U.S. PATENT DOCUMENTS

| | | | | |
|---|---|---|---|---|
| 2007/0077843 | A1 † | 4/2007 | Harkenrider | |
| 2012/0175069 | A1 † | 7/2012 | Rupel | |
| 2018/0216402 | A1 * | 8/2018 | Lynch | E06B 9/386 |
| 2019/0339426 | A1 * | 11/2019 | Malkan | D03D 1/007 |
| 2020/0114629 | A1 * | 4/2020 | Swiszcz | B32B 15/14 |

OTHER PUBLICATIONS

Martin A. Hubbe, and Alexander A. Koukoulas, “Wet-Laid Nonwovens Manufacture—Chemical Approaches Using Synthetic and Cellulosic Fibers”, BioResources 11(2), 2016, pp. 5500~5552. Retrieved from the Internet https://bioresources.cnr.ncsu.edu/resources/wet-laid-nonwovens-manufacture-chemical-approaches-using-synthetic-and-cellulosic-fibers/.†

Ma Jianwei and Chen Shaojuan, “Non-woven Fabric Technology Overview (2nd Edition)”, ISBN-13: 9787506449991, Aug. 2008, cover page , pp. 2 and 148, China Textile Press, Beijing, China. (ISBN information can be retrieved from WorldCat: https://search.worldcat.org/title/1031189517?oclcNum=1031189517).†

Tara Olivo, “Nonwovens At Home” webpage, Apr. 18, 2016. (https://www.nonwovens-industry.com/issues/2016-04-10/view_features/nonwovens-at-home/) Retrieved from Internet Archive Wayback Machine http://web.archive.org/web/20160418073912/https://www.nonwovens-industry.com/issues/2016-04-10/view_features/nonwovens-at-home/.†

* cited by examiner
† cited by third party

LAMINATE

CROSS-REFERENCE TO RELATED APPLICATIONS

The present application is a national phase application of International Patent Application No. PCT/US2022/022293, filed Mar. 29, 2022, which, in turn, is based upon and claims the right of priority to U.S. Provisional Patent Application No. 63/167,972, filed Mar. 30, 2021, the disclosures of both of which are hereby incorporated by reference herein in their its-entirety for all purposes.

FIELD OF THE INVENTION

The field of the present invention pertains to fabric laminates, including nonwoven fabric laminates that may be used as a component in coverings for architectural structures.

BACKGROUND

Coverings for architectural structures or features such as architectural openings including windows, doors, archways, and the like (hereinafter "architectural structures" for the sake of convenience without intent to limit) come in many different forms and configurations. In addition to draperies, such architectural coverings, or "coverings" for the sake of non-limiting simplicity, can include blinds, shades, and the like. In some applications, the covering is retractable or extendable across the architectural structure to alter the amount of light passage and visibility across the covering. Different types of architectural coverings include, for instance, roller blinds and roller shades, pleated shades, roman shades, vertical blinds, shutters, woven wood shades, and cellular shades.

During use, different coverings may fold the fabric of the covering element along a given direction to retract the covering. Some coverings may include operable vanes that are movable between open and closed positions. In addition to being manipulated within the architectural structure, coverings also should have excellent drape characteristics. For instance, the covering should present a uniform and aesthetic appearance. In the past, for instance, coverings have been made from woven or knitted fabrics. Woven and knitted fabrics, however, tend to be not only expensive to produce but are also relatively heavy. Thus, the materials are not amendable to being manipulated when a covering is retracted or extended.

In view of the above, those skilled in the art have attempted to use nonwoven materials and/or films as covering materials. Such materials have provided great advances in the art. For instance, nonwoven laminates can be tailored to allow a desired amount of light through the material for a particular application. Nonwoven laminates, for instance, can be designed to allow a significant amount of light into a room or can be designed to completely block out light. In addition, the materials are relatively inexpensive to produce and can be manipulated on commercial machinery at relatively fast rates.

Further improvements in coverings for architectural structures, however, are still needed. In particular, a need exists for a covering that is relatively light weight, is not overly complicated to produce, and has the look of a woven product. In addition, a need exists for a nonwoven covering for architectural structures that has excellent drape characteristics without producing creases, puckering or other undesirable non-uniform undulations during use.

SUMMARY

The present disclosure is generally directed to a laminate for an architectural covering and a method for producing the same. The laminate includes a base layer comprising a nonwoven web. The base layer has a first surface and a second and opposite surface. The base layer contains at least a first fiber type. A majority of the fibers of the first fiber type can be oriented in a first direction within the nonwoven web. A second layer is laminated to the first surface of the base layer. The second layer comprises a layer of filaments oriented along a second direction. The second direction is perpendicular or skew to the first direction. For example, in one aspect, the fibers of the first fiber type in the base layer are primarily oriented along a length direction while the layer of filaments laminated to the first surface of the base layer are oriented along a width direction. In this manner, a covering is produced having excellent tear strength properties and having an excellent balance of stiffness in the length direction and softness in the width direction. These properties combine together to produce a material with excellent drape characteristics, especially when incorporated into a window shade or blind.

In one aspect, the base layer is a wet laid web containing fibers of a first fiber type and fibers of a second fiber type. The fibers of the first fiber type can be synthetic fibers, such as polyester fibers. The fibers of the second fiber type, on the other hand, can be binder fibers that are thermally bonded to adjacent fibers in the nonwoven web. The binder fibers, for instance, can be conjugate fibers having a core and sheath structure. The sheath of the conjugate fibers can be made from a polymer having a lower melting point for thermally bonding two adjacent fibers when heated under pressure.

The fiber or filaments of the second layer can be made from any suitable polymer. For example, the polymer filaments can be made from a polyester polymer.

In one embodiment, the laminate can include a third layer. The third layer can comprise a layer of yarns that are oriented along a specific direction of the laminate. For instance, the yarns can be oriented in the length direction or alternatively in the width direction. In one particular aspect, the yarns are oriented in the length direction, while the filaments are oriented in the width direction. The third layer can be a nonwoven in which the layer of yarns are oriented along a certain direction without any significant yarn entanglement. The yarns can comprise multifilament yarns or mono-filament yarns. In still another aspect, the yarns can be spun yarns.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
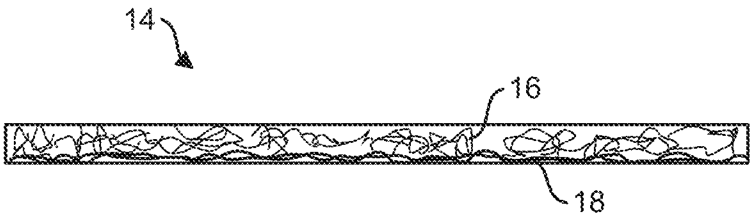
FIG. 1 is a cross-sectional view of one embodiment of a laminate in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

In summary, the present disclosure is directed to a laminate that is well suited for use in constructing architectural coverings. The laminate generally contains a nonwoven base layer laminated to a layer of filaments that are primarily oriented along a desired direction, such as the width direction of the laminate. The base layer, on the other hand, can be a wet laid nonwoven web containing polymer fibers. For example, the nonwoven web can contain at least a first fiber type and a second fiber type. The first fiber type can comprise polymer fibers made from any suitable polymer, such as a polyester. The second fiber type, on the other hand, can be binder fibers that serve to increase the integrity of the web. The binder fibers, for instance, can comprise monocomponent or multi-component fibers in which a polymer having a relatively low temperature is present on the surface of the fibers for allowing thermal bonds to form between the binder fibers and the other fibers contained in the laminate. The second layer laminated to the base layer can be a layer of continuous filaments, such as spunbond filaments. Alternatively, the laminate can include a third layer. The third layer can be a layer of non-woven yarns that are also oriented along a desired direction. In one particular aspect, the polymer filaments of the second layer are oriented in the width direction while the yarns of the third layer are oriented in the length direction.

Laminates made according to the present disclosure can include a very desirable balance of properties. For instance, the laminates can have relatively high tear strength, especially in the length direction. In addition, the laminate can be relatively stiff in the length direction while having a soft hand in the cross or width direction.

Laminates made according to the present disclosure can be very economical to produce. In addition, in one aspect, the laminates can be constructed so as to be very thin and have a relatively light weight while still possessing all of the desirable properties described above.

Referring to FIG. 1, one embodiment of a laminate 10 made in accordance with the present disclosure is shown. As illustrated in FIG. 1, the laminate 14 includes a base layer 16 attached to a second layer 18. The base layer 16 is a non-woven web containing at least one fiber type. In one aspect, the base layer 16 can be a wet laid, non-woven web. Wet laid webs are made by depositing an aqueous suspension of fibers onto a moving forming surface. In one aspect, the fibers are deposited on the moving forming surface such that the majority of the fibers are oriented in one direction, such as the machine direction, which can later become the length direction. The use of a wet laid web can provide various advantages and benefits. For instance, the physical properties of the web can be manipulated by controlling the wet laid process and/or selecting the type of fibers that are used to form the web. For example, the above techniques can be used to alter the physical properties of the web so that the web is optimized for a particular application. For instance, wet laid webs can be made that have augmented stiffness properties in one direction compared with the stiffness properties of the web in a perpendicular direction. Controlling the stiffness properties of the web in a directional manner can produce webs having excellent drape properties. Of particular advantage, wet laid webs can be made with desired physical properties at extremely low basis weights and thicknesses. In addition, wet laid webs can be created with greater uniformity with respect to various properties, especially in comparison to spunbond webs, meltblown webs, and/or hydroentangled webs.

As described above, wet laid webs are formed from a liquid suspension, such as an aqueous suspension of fibers or fiber furnish. The liquid suspension of fibers is deposited onto a forming mesh or fabric from a head box. The forming surface permits the draining of the newly formed web. The wet laid process can include vacuum dewatering systems for further increasing the amount of liquids that are removed from the web as it is deposited onto the forming surface.

In one embodiment, the fiber furnish is deposited onto one or more consecutive forming fabrics with the fibers aligned in one particular or selected direction. For instance, if the forming mesh has a surface speed different than the speed at which the fiber suspension leaves the headbox (e.g., higher or lower speed), fibers may be laid onto the forming mesh in alignment with the direction of motion of the forming mesh (e.g., the machine direction) as the fibers are either dragged or pushed by the aforementioned surface speed differential. In some cases, the rate of drying may be increased, such as with vacuum systems, to lock in the orientation of the fibers as laid on the forming mesh while minimizing opportunities for the fibers to re-disperse. The direction and magnitude of the surface speed differential as well as the rate of drying may be controlled to achieve the desired orientation of the fiber furnish.

The amount and type of fiber used to form the wet laid nonwoven webs 16 can vary depending upon the particular application and the desired result. In one embodiment, for instance, the nonwoven web 16 is made exclusively from synthetic or polymer fibers. The fibers can comprise, for instance, short fibers, staple fibers, longer fibers, filaments, and the like. The synthetic fibers can be made from any suitable polymer, such as a polyester polymer, a polyolefin polymer such as polyethylene or polypropylene, an acrylic polymer, and the like. In one embodiment, the nonwoven web 16 can also contain cellulosic fibers, such as pulp fibers, regenerated cellulose fibers such as rayon, cotton fibers, and the like.

In order to improve web integrity, the wet laid nonwoven web 16 generally contains a binder. The binder can be used to bond the fibers together within the web thereby increasing strength and locking in the stiffness characteristics. Although the binder may be an adhesive sprayed or otherwise applied to the web, in one embodiment, the binder is comprised of binder fibers incorporated into the web. As used herein, binder fibers are fibers that can bond to other fibers in the web using chemical, mechanical, or thermal means. For instance, in one embodiment, the binder fibers may comprise thermally bondable fibers that, when heated, form thermal bonds with other fibers at their point of intersection.

When the nonwoven webs contain thermally bondable fibers, the webs can be heated in order to activate the fibers and cause bonding to occur within the web. The web can be heated using various different processes or techniques. For instance, in one embodiment, the wet laid web can be fed through heated calender or patterned rolls that can reduce the thickness of the web while simultaneously cause the binder fibers to form bonds at points of intersection with other fibers. In an alternative embodiment, a hot fluid, such as air, can be blown through the wet laid web in order to cause fiber bonding to occur. Using a flow of heated air may preserve the bulk of the web.

The type and amount of binder fibers incorporated into the wet laid nonwoven web 16 can have a substantial impact on the stiffness properties of the web. In general, for instance, greater amounts of binder fibers can increase the stiffness of the web. Thus, the content of binder fibers within the nonwoven web 16 can be varied to manipulate the stiffness characteristics of the web.

In general, binder fibers can be present in the wet laid nonwoven web 16 in an amount sufficient to lock in the orientation of the fibers but in an amount insufficient to increase the stiffness properties so as to completely destroy the drape properties of the web. For example, the binder fibers can be present in the nonwoven web in an amount greater than about 5% by weight, including all increments of 1% by weight thereafter, such as greater than about 10% by weight, such as greater than about 15% by weight, such as greater than about 20% by weight, such as greater than about 25% by weight, such as greater than about 30% by weight, such as greater than about 35% by weight, such as greater than about 40% by weight, such as greater than about 45% by weight. In one embodiment, the wet laid nonwoven web can be made exclusively from binder fibers. In other embodiments, the binder fibers can generally be present in an amount less than about 80% by weight, including all increments of 1% by weight thereafter, such as by being present in the nonwoven web in an amount less than about 75% by weight, such as in an amount less than about 70% by weight, such as in an amount less than about 65% by weight, such as in an amount less than about 60% by weight, such as in an amount less than about 55% by weight.

As described above, the binder fibers can be made from various different materials. In one embodiment, the binder fibers are made from a polymer having a lower melting temperature. For instance, the binder fibers can be made from a polymer, such as a polyester, having a melting temperature of less than about 200° C., such as less than about 180° C., such as less than about 160° C., such as less than about 140° C., such as less than about 120° C., such as less than about 100° C. and generally greater than about 80° C., such as greater than about 90° C., including all increments of 1° C. therebetween.

In one embodiment, the nonwoven web 16 can contain binder fibers that comprise conjugate fibers, such as bicomponent fibers. Conjugate fibers typically have a core-and-sheath structure wherein the core contains a polymer with a higher melting temperature than the polymer of the sheath. In this manner, conjugate fibers may permit good thermal bonding within the nonwoven web while maintaining structural integrity. For instance, the core may contain one polymer selected for its strength and high melting point, and the sheath may contain another polymer selected for its adhesion properties and a lower melting point. For instance, the polymer contained within the sheath may have a melting point of generally less than about 200° C., and greater than about 80° C. including all increments of 1° C. therebetween. The core polymer, on the other hand, can generally have a melting temperature higher than the sheath polymer. In this manner, the sheath polymer when subjected to heat, melts and bonds to other fibers within the web at intersecting points. The core polymer, however, allows the bicomponent binder fiber to retain its shape and provide strength.

The size and the length of the fibers may be selected to achieve the desired softness and hand of the resultant laminate and/or to influence other properties of the nonwoven web. Fibers can be used having a low denier for increased softness to the touch. For instance, the fibers can have a size of from about 0.01 denier to about 10 denier including increments of 0.1 denier therebetween. The length of the fibers can generally be from about 0.1 mm to about 30 mm including increments of 1 mm therebetween. In one embodiment, the length of the fibers may be less than about 15 mm, such as less than about 10 mm. Shorter fibers can also increase softness and flexibility.

The amount of different fiber types and different lengths present in the wet laid nonwoven web 16 can vary depending upon the desired physical properties of the resulting web. In one embodiment, the nonwoven web contains binder fibers in conjunction with one other synthetic fibers. In an alternative embodiment, the nonwoven web contains binder fibers in conjunction with two other different types of synthetic fibers. The two other types of synthetic fibers can differ by composition, fiber length, and/or fiber size. The length, size and composition of the fibers can be varied in order to alter the characteristics of the nonwoven web including the tactile feel, the stiffness, and various other physical properties.

In one aspect, the nonwoven web or base layer 16 can contain binder fibers in combination with synthetic polymer fibers. The synthetic polymer fibers may comprise polyester fibers that have a higher melting temperature than the binder fibers. The polymer or polyester fibers can be present in the base layer 16 in an amount generally greater than about 20% by weight, such as greater than about 30% by weight, such as greater than about 40% by weight, and generally less than about 65% by weight, such as less than about 60% by weight. The polymer fibers and/or the binder fibers can have the characteristics as described above such as a denier of from about 0.01 to about 10 and a fiber length of from about 0.1 mm to about 30 mm.

The web 16 can have various different characteristics and properties depending upon the particular application. For example, in certain embodiments, the web 16 can be lightweight and have a low basis weight, such as a basis weight of less than about 30 gsm. Wet laid webs made in accordance with the present disclosure, for instance, can be formed at very low basis weights while still having the desired stiffness and drape properties. Many other types of webs, such as hydroentangled webs or spunbond webs, cannot be formed at the above lower basis weights and have the stiffness properties of the nonwoven webs described herein. The ability to incorporate lightweight nonwoven webs into the laminate illustrated in FIG. 1 can provide various advantages and benefits depending upon the particular application and the desired result. For instance, lighter basis weight materials add less weight to the total product or covering and can be more economical to manufacture. For instance, the nonwoven web can have a basis weight of generally less than about 25 gsm, including increments of less than 1 gsm thereafter, such as less than about 20 gsm, such as less than about 18 gsm, such as less than about 16 gsm, and a basis weight generally greater than about 5 gsm (e.g., in 1 gsm increments), such as greater than about 6 gsm, such as greater than about 8 gsm, such as greater than about 10 gsm.

Figure 6:
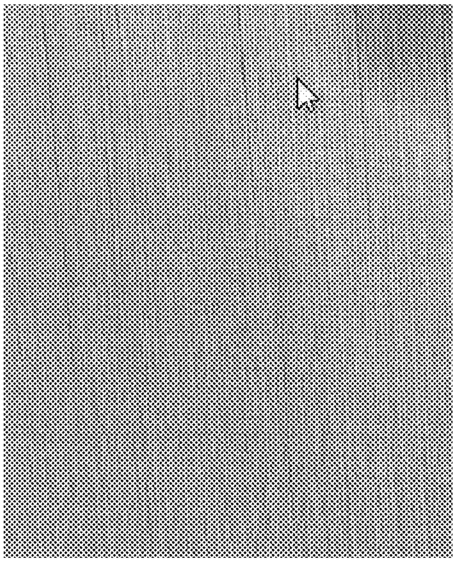
FIG. 6 is a photographic image of one embodiment of a laminate made in accordance with the present disclosure, particularly providing an image of a visual effect achieved with the disclosed laminate.

As shown in FIG. 1, in addition to the base layer 16, the laminate 14 includes a second layer 18. FIG. 6 illustrates the visual effect achieved when combining the base layer 16 with the second layer 18. The second layer 18 can be comprised of filaments, such as continuous filaments that are oriented along a width direction of the laminate. For example, as described above, in one aspect, a majority of the fibers contained in the base layer 16 can be oriented in the machine direction or the length direction, while the filaments of the second layer 18 can be oriented in the cross-machine direction or the width direction.

The second layer 18 can be used to increase the stiffness of the laminate 14 in the width direction which can greatly and dramatically enhance drape characteristics of the laminate. For instance, the wet laid nonwoven web 16 can provide length direction strength, while the filament layer 18 can provide strength in the width direction and increase stiffness which produces a material that does not crease, pucker, of form other undesirable non-uniform undulations, such as wrinkles or other non-uniformities when incorporated into an architectural covering.

In one embodiment, the filaments contained within the second layer 18 are spunbond filaments that are formed directly on the base layer 16. The spunbond filaments can be drawn using hot air in order to produce very fine fibers with small diameters. For instance, the filaments contained in the second layer 18 can have a denier of less than about 5, such as less than about 4, such than less than about 3, such as less than about 2, such as even less than about 1. The denier is generally greater than about 0.01, such as greater than about 0.1.

The basis weight of the second layer is generally less than about 35 gsm, such as less than about 30 gsm, such as less than about 28 gsm, such as less than about 24 gsm, such as less than about 22 gsm. The basis weight of the second layer 18 is generally greater than about 10 gsm, such as greater than about 15 gsm, such as greater than about 17 gsm, such as greater than about 18 gsm. In this manner, the basis weight of the overall laminate 14 as shown in FIG. 1 can generally be greater than about 20 gsm, such as greater than about 25 gsm, such as greater than about 30 gsm, and generally less than about 65 gsm, such as less than about 55 gsm, such as less than about 50 gsm, such as less than about 45 gsm, such as less than about 40 gsm.

As described above, the second layer 18 can be formed directly on the base layer 16. In this manner, the filaments contained in the second layer 18 can still be in a molten state and bond to the base layer 16. Consequently, the laminate 14 can be produced without any adhesive layers in between the base layer 16 and the second layer 18. Alternatively, an adhesive may be sprayed, spread or otherwise applied in between the two layers.

In one aspect, the laminate 14 as shown in FIG. 1 can be fed through a hot embossing process for increasing the attachment between the layers and increasing the overall integrity of the product. For example, in one particular embodiment, the laminate 14 can be fed through two heated calender rolls. Alternatively, the laminate 14 can be fed between two heated and patterned embossing rolls and can be, for instance, point bonded. In one aspect, when point bonding the laminate 14, the point bonds can cover approximately 10% to about 90% of the surface area of one side of the laminate. For instance, the point bonds can be applied so as to form embossing points that cover greater than about 20%, such as greater than about 25%, such as greater than about 30% of the surface area of one side of the base layer. The embossing pattern can form embossing points that cover less than about 70%, such as less than about 60%, such as less than about 50%, such as less than about 40% of the surface area of one side of the laminate 14. The point bonds can form thermal bonds not only between fibers contained in the base layer 16 but between fibers in the base layer 16 and filaments in the second layer 18.

In one embodiment of the present disclosure, the laminate 14 is a two layer product as shown in FIG. 1. Alternatively, the laminate of the present disclosure can include three layers, four layers, five layers, or six layers. The laminate generally contains less than about ten layers, such as less than about eight layers, such as less than about six layers, such as less than about five layers.

Figure 2:
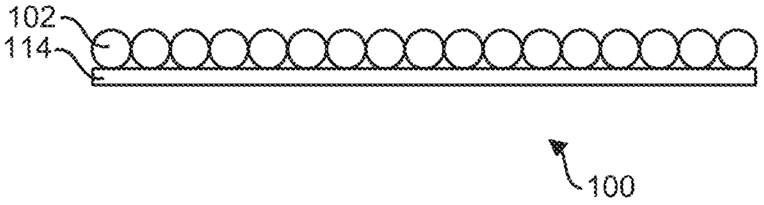
FIG. 2 is a cross-sectional view of an alternative embodiment of a laminate made in accordance with the present disclosure.
Figure 3:
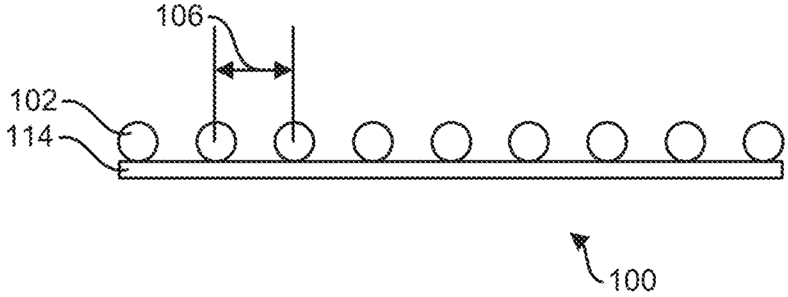
FIG. 3 is still another embodiment of a laminate made in accordance with the present disclosure.

In one alternative embodiment, the laminate of the present disclosure can include three layers as illustrated in FIGS. 2 and 3. Referring to FIG. 2, for instance, a laminate 100 is shown that includes the two layer laminate 114 as illustrated and described in FIG. 1 attached to a third layer 102. As shown in FIG. 2 the third layer 102 can be a nonwoven layer that includes a layer of yarns aligned along a certain direction, such as in the length direction or the machine direction of the laminate 100. In this manner, the layer of yarns 102 are oriented in the length direction while the filaments contained in the laminate 114 are oriented in the width direction. The yarns in the layer 102 can be place parallel to each other as shown in FIG. 2 without any yarn entanglement. The oriented yarns that make up the third layer 102 can be joined to the two layer laminate 114 using any suitable method or technique. For instance, in one aspect, the oriented yarns 102 can be attached to the laminate 114 using adhesive bonds, thermal bonds, or combinations thereof. In one embodiment, an adhesive can be printed onto the laminate 114 for attaching to the third layer 102.

The oriented yarns 102 can be selected from monofilament yarns, multifilament yarns, or spun yarns. The particular type of yarn can be selected based upon various factors. For instance, the particular type of yarn can be selected based upon the desired appearance. Monofilament yarns, for instance, produce a more uniform appearance than spun yarns. The type of yarn can also be selected based upon the physical properties that are desired in the final product. For example, monofilament yarns tend to be stiffer than multifilament yarns or spun yarns. Spun yarns or multifilament yarns, on the other hand, have a softer feel than monofilament yarns.

In one aspect, the layer of yarns 102 is made from spun yarns. The spun yarns can contain synthetic or natural fibers. For instance, the spun yarns can contain cotton fibers, rayon fibers, viscous fibers, polyester fibers, acrylic fibers, and mixtures thereof. In one particular aspect, the yarns 102 can include spun yarns made from a mixture of cotton fibers and polyester fibers. The yarns can have any suitable size, for instance, the spun yarns can have a size of from about 20 singles to about 40 singles.

Figure 7:
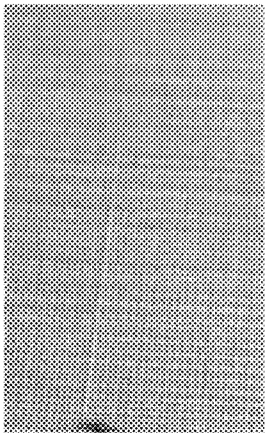
FIG. 7 is a photographic image of one embodiment of a laminate made in accordance with the present disclosure, particularly providing an image of a visual effect achieved with the disclosed laminate.

FIG. 7 illustrates the visual effect that occurs when the layer of yarns 102 is applied to the laminate 114. The fabric can appear to be a woven fabric with a plain weave.

As shown in FIGS. 2 and 3, the spacing 106 can be varied between the oriented yarns in the layer 102. Changing the spacing 106 between the yarns can directly influence the appearance of the laminate 100. For example, spacing the yarns farther apart can create greater depth perception and a more three dimensional configuration.

Figure 4:
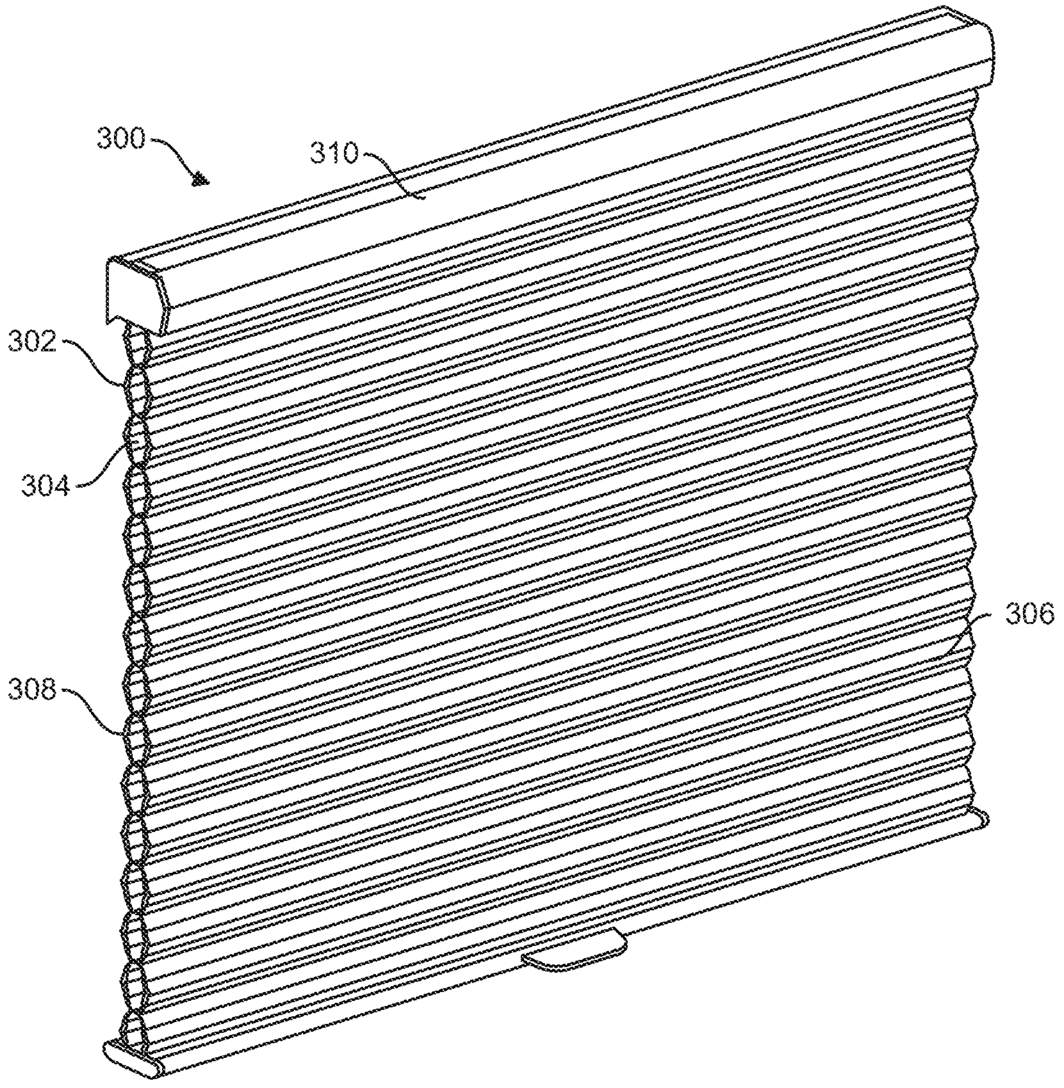
FIG. 4 is a perspective view of one embodiment of a cellular shade that may be made in accordance with the present disclosure.
Figure 5:
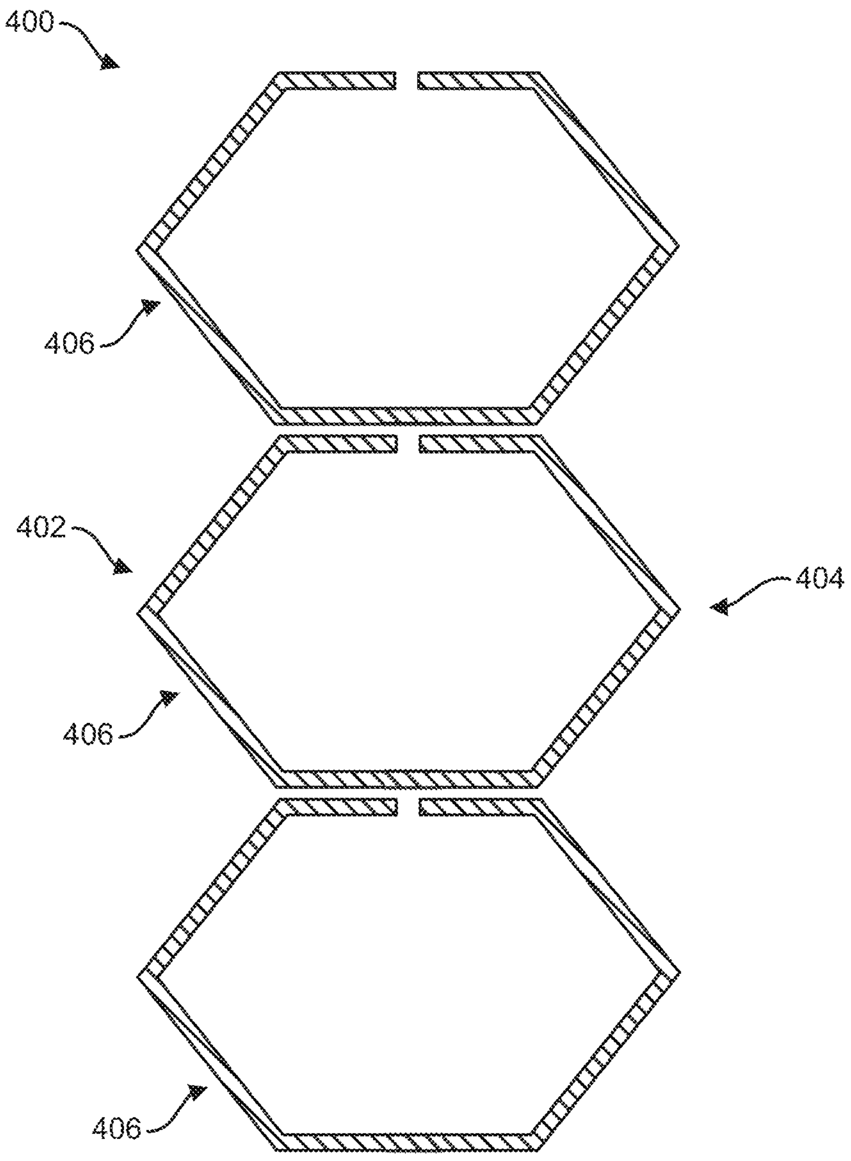
FIG. 5 is a partial cross-sectional view of the cellular shade as shown in FIG. 4.

The material of the present disclosure with one or more features disclosed herein may be fashioned into any variety of architectural structure coverings, such as a shade that can be raised and lowered. Referring to FIG. 4, a cellular shade 300 that may be made in accordance with the present disclosure is shown. Cellular shades, such as cellular shade 300 as shown in FIG. 4, are commercially available under the name ARCHITELLA from Hunter Douglas. The ARCHITELLA cellular shade, such as cellular shade 300, has a honeycomb-within-a-honeycomb construction. Alternatively, the cellular shade 300 can have a single layer honeycomb construction as shown in FIG. 5.

As shown in FIG. 4, for instance, the cellular shade 300 includes collapsible internal cells 302 and collapsible external cells 304. The internal cells 302 can be made from various different types of material. For example, the internal cells 302 can be made from a sheer material that allow maximum light transmission or can be made from a metalized fabric or film that includes a base layer laminated to a metal foil layer. The metalized coating can block light transmission and provide for thermal insulation.

The external cells 304 form a first side 306 and a second side 308 of the cellular shade 300. The first side 306 and the second side 308 can be constructed from the same or different materials. When installed in an architectural opening, such as a window, the first side 306 is positioned to face the interior of a room. In accordance with the present disclosure, either the first side 306, the second side 308, both sides 306 and 308, and/or the internal cells 302 can be made from a laminate made in accordance with the present disclosure.

As shown in FIG. 4, the cellular shade 300 can further include a head rail 310 that is designed to be mounted adjacent to an architectural opening. The head rail can cover a mechanism for raising and lowering the shade 300.

Referring to FIG. 5, another embodiment of a cellular shade 400 made in accordance with the present disclosure is shown. In the embodiment illustrated in FIG. 5, the cellular shade 400 includes a single layer of collapsible honeycomb cells. The cellular shade 400 has a first side 402 and a second side 404. The first and the second sides may be constructed of the same or different materials. In accordance with the present disclosure, either the first side 402, the second side 404, or both sides 402 and 404 can be made from a laminate in accordance with the present disclosure such as a laminate as shown in FIG. 1, FIG. 2 or FIG. 3.

As yet another example, the laminate of the present disclosure can also be fashioned into one or more different types of rollable coverings, such as panel roller shades, cellular roller shades, vaned roller shades, and/or the like. For instance, the disclosed laminate may be suitable for use within rollable coverings commercially available under the name SILHOUETTE and/or SONNETTE from Hunter Douglas. As indicated above, the laminate can be constructed so as to be relatively thin, which can be advantageous for use with rollable coverings to reduce the overall roll-up diameter of the covering. Moreover, the flexibility and/or softness of the disclosed laminate in the cross direction is also advantageous for coverings configured to be rolled-up onto a roller tube or similar roller.

Many types of architectural coverings can incorporate a material of the present disclosure. The architectural coverings may include shades (e.g., door shades, window shades, skylight shades, Roman shades, curtains) or blinds (e.g., Venetian blinds, louvers). For example, a shade may be largely planar, containing one or more layers of the material disclosed herein. Any shade or other covering constructed according to the present disclosure may be, for example, rolled up, folded or collapsed along pleats or creases, or slid along a track for storage or adjustment.

Coverings prepared according to the present disclosure may include first and second faces (e.g., indoor-oriented and outdoor-oriented faces) comprising the same or different materials. In some embodiments, only one of the first and second faces comprise the material of the present disclosure, and the other comprises any other suitable material.

The foregoing description has broad application. It should be appreciated that the concepts disclosed herein may apply to many types of architectural structure coverings, in addition to the coverings described and depicted herein. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be embodied and employed in a variety of measures and coordinates and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference of the present disclosure.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

The phrases "at least one," "one or more," and "and/or," as used herein, are open-ended expressions that are both conjunctive and disjunctive in operation. The term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority but are used to distinguish one feature from another. The drawings are for purposes of illustration only and the dimensions, positions, order and relative sizes reflected in the drawings attached hereto may vary.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit. Additionally, although individual features may be included in different claims, these may possibly advantageously be combined, and the inclusion in different claims does not imply that a combination of features is not feasible and/or advantageous. Reference signs in the claims are provided merely as a clarifying example and shall not be construed as limiting the scope of the claims in any way.

What is claimed:

1. A laminate for an architectural covering comprising:

a base layer comprising a wet laid nonwoven web, the base layer having a first surface and a second and opposite surface, the nonwoven web containing at least a first fiber type, the first fiber type comprising polymer fibers, the base layer having a basis weight of less than about 30 gsm; and a second layer laminated directly to the first surface of the base layer, the second layer comprising a spunbond web of filaments oriented along a first direction; wherein the laminate has been point bonded covering about 10% to about 90% of the first surface or the second surface.

2. A laminate as defined in claim 1, wherein the fibers of the first fiber type comprise polymer fibers having an average length of less than about 30 mm.

3. A laminate as defined in claim 1, wherein the majority of the fibers of the first fiber type in the base layer are oriented in a second direction, the second direction being perpendicular or skew to the first direction.

4. A laminate as defined in claim 2, wherein the fibers of the first fiber type comprise polyester fibers.

5. A laminate as defined in claim 2, wherein the nonwoven web contains a second fiber type, the second fiber type comprising binder fibers.

6. A laminate as defined in claim 1, wherein the base layer has a basis weight of from about 5 gsm to about 20 gsm.

7. A laminate as defined in claim 1, wherein the laminate has been point bonded by forming a pattern of point bonds over a surface of the base layer, the surface of the base layer having a surface area and wherein the point bonds cover from about 10% of the surface area to about 90% of the surface area of the base layer.

8. A laminate as defined in claim 1, wherein the laminate has a thickness of less than about 0.7 mm.

9. A laminate for an architectural covering comprising:

a base layer comprising a wet laid nonwoven web, the base layer having a first surface and a second and opposite surface, the nonwoven web containing at least a first fiber type, the first fiber type comprising polymer fibers, the base layer having a basis weight of less than about 30 gsm; and a second layer laminated directly to the first surface of the base layer, the second layer comprising a spunbond web of filaments oriented along a first direction, wherein the laminate further comprises a third layer, the third layer comprising a layer of yarns oriented along a second direction of the base layer, the second direction being perpendicular to the first direction.

10. A laminate as defined in claim 9, wherein the yarns comprise spun yarns containing polyester fibers.

11. A laminate as defined in claim 9, wherein the laminate has a length direction and a width direction and wherein the layer of yarns are oriented in the length direction and the layer of filaments are oriented in the width direction.

12. A laminate as defined in claim 5, wherein the binder fibers are present in the nonwoven web in an amount from about 25% to about 60% by weight.

13. A laminate as defined in claim 2, wherein the fibers of the first fiber type have a denier of from about 0.01 to about 10 and have an average length of less than about 15 mm.

14. A laminate as defined in claim 1, wherein the filaments of the second layer comprise continuous filaments having a denier of less than about 2.

15. A laminate as defined in claim 1, wherein the filaments comprise mono-component filaments.

16. An architectural covering comprising;

a facing layer spaced from a backing layer, wherein at least one of the facing layer or the backing layer comprises the laminate as defined in claim 1.

17. An architectural covering as defined in claim 16, wherein the facing layer and the backing layer form a plurality of cells that extend from a top of the architectural covering to a bottom of the architectural covering.

18. An architectural covering as defined in claim 17, wherein the plurality of cells comprise closed cells.

19. An architectural covering comprising:

a facing layer spaced from a backing layer, wherein the backing layer is configured to face an architectural structure and wherein the facing layer is made from the laminate as defined in claim 1.

* * * * *